H. KOCOUREK.
MAGNETIC SPEEDOMETER.
APPLICATION FILED MAY 27, 1912.
1,042,122.
Patented Oct. 22, 1912.
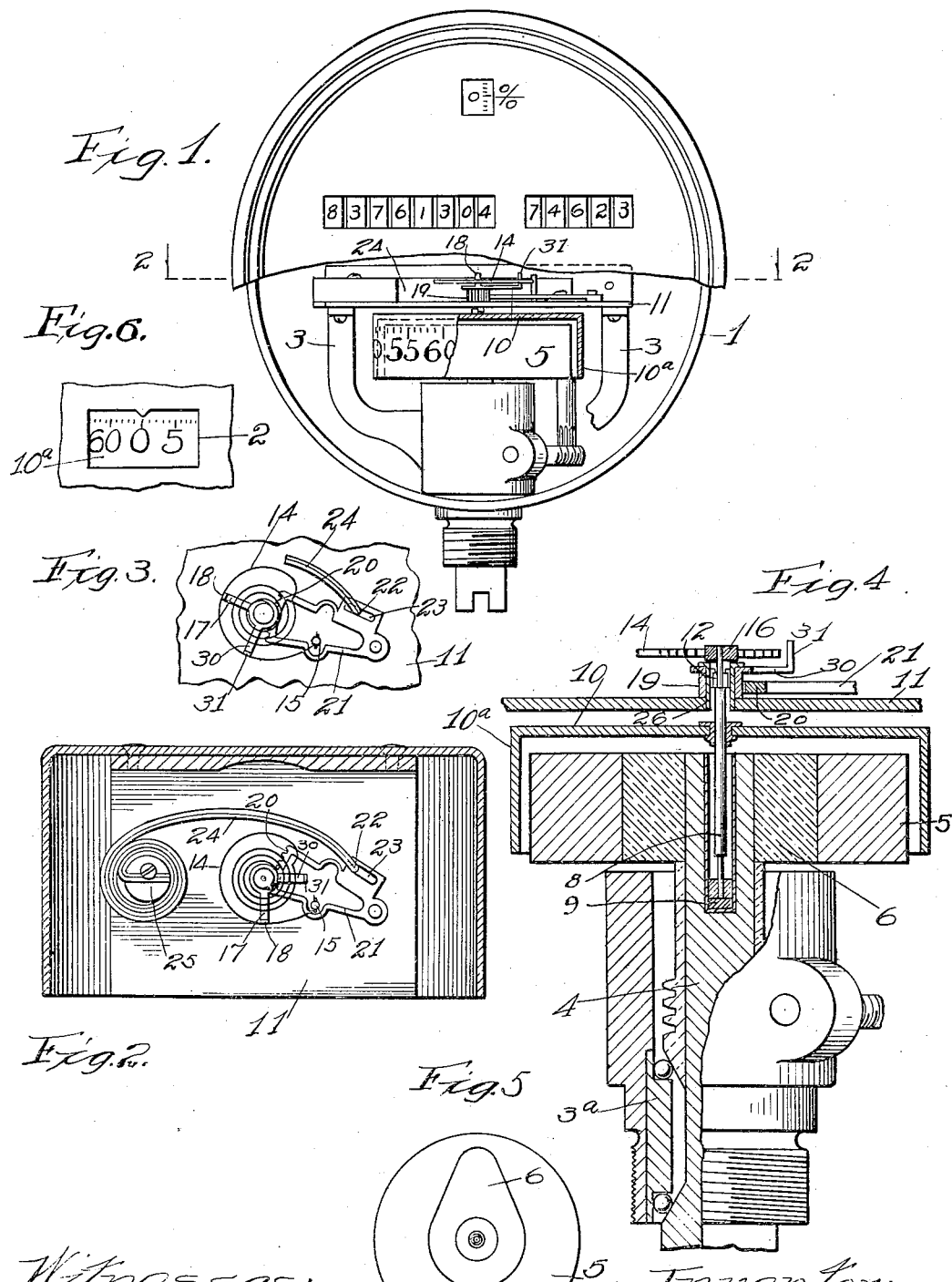
Witnesses:
Inventor:
Henry Kocourek.
by Burton & Burton
his Atty's.

UNITED STATES PATENT OFFICE.

HENRY KOCOUREK, OF CHICAGO, ILLINOIS, ASSIGNOR TO STEWART & CLARK MANUFACTURING COMPANY, OF CHICAGO, ILLINOIS, A CORPORATION OF ILLINOIS.

MAGNETIC SPEEDOMETER.

1,042,122.  Specification of Letters Patent.  Patented Oct. 22, 1912.

Application filed May 27, 1912. Serial No. 699,833.

*To all whom it may concern:*

Be it known that I, HENRY KOCOUREK, a citizen of the United States, residing at Chicago, in the county of Cook and State of Illinois, have invented new and useful Improvements in Magnetic Speedometers, of which the following is a specification, reference being had to the accompanying drawings, forming a part thereof.

The purpose of this invention is to provide a magnetic speedometer in which the magnet element is of a form well adapted for compactness of the instrument and ease and cheapness of construction of the magnet, and also to provide in such an instrument improved means for compensating for error due to temperature changes.

It consists in the elements and features of construction shown and described as indicated in the claims.

In the drawings: Figure 1 is a front elevation of an instrument embodying this invention. Fig. 2 is a section at the line 2—2 on Fig. 1. Fig. 3 is a detail plan view of the regulating device at a different position from that shown in Fig. 2. Fig. 4 is a section axial with respect to the magnet. Fig. 5 is a plan view of the magnet. Fig. 6 is a detail elevation showing the speed indicator window of the casing.

The instrument shown in the drawings comprises an exterior case, 1, in the form of a cup, having in its cylindrical wall an aperture or window, 2, through which the speed indication is visible. Rigidly mounted within the casing is frame structure, 3, which affords a bearing, 3ª, for the rotating shaft, 4, upon which within the case there is mounted a magnet, 5, preferably in the form of a complete or closed ring, as seen in Fig. 3, mounted on the shaft co-axially therewith, by means of a carrier, 6, of non-magnetic material which occupies the aperture of the ring magnet. The shaft, 4, is axially bored from the upper end to receive a step bearing, 8, for the spindle, 9, of the drag disk, 10, which, when the spindle is stepped in its bearing, lies directly above and very slightly separated from the upper surface of the ring magnet, but out of contact therewith. Above the drag disk, 10, there is fixedly mounted on the frame, 3, and rigidly secured to the casing a soft iron or steel plate, 11. This plate is very slightly spaced from the drag disk, but out of contact therewith, and it supports a jewel bearing, 12, for the spindle of the drag disk as more particularly hereinafter described. The drag disk has a petticoat or cylindrical flange, 10ª, which depends around the magnet very close thereto out of contact therewith,—the space being exaggerated in the drawings,—and completely encompassing it. The petticoat hangs immediately behind the window, 2, and upon the outer surface of the petticoat it carries the speed-indicating scale graduated according to the use to which the instrument is to be put. As illustrated, the instrument is graduated in miles per hour of travel of the vehicle to which the instrument is to be attached.

Above the plate, 11, a helical hair spring of customary form for such purposes has its outer coil attached to a post, 15, rigid with the plate, and its inner end to a collet, 16, on the spindle of the drag disk. For regulating the spring, that is, for varying the resistance which it opposes to the dragging of the disk by the magnet in order to compensate for the effect upon the drag disk of change of temperature, there is provided a curb lever, 17, mounted for swinging about the axis of the spindle and carrying a curb pin, 18, positioned so as to swing just within the outer coil of the hair spring and constitute a stop against which the spring becomes pressed as soon as it is coiled to the slightest extent by the turning of the disk away from zero position. For swinging the curb lever about the axis of the spindle to vary the point on the spring at which the latter bears upon the curb pin, the curb lever has about its axis a small pinion, 19, meshing with a gear segment, 20, formed at the extremity of a relatively long lever, 21, which is pivoted on the plate, 11. This lever is connected near its pivot by a pin, 22, engaging a slot, 23, in the lever, with the free end of the bi-metallic bar, 24, which is disposed above the plate, 11, near the margin thereof, and rigidly secured on a post, 25, at the end remote from that at which the segment lever is connected as stated. The form of this bi-metallic bar is not of vital importance, but I find it convenient, in order to obtain a desirable length, to helically coil it for several coils about the post, 25, by which it is rigidly secured to the plate, 11,—then extending it in the conveniently available space near the margin of the plate around to the point at which it is connected by the pin, 22, with the segment lever. In order to provide an adequate support for the curb lever and pinion at the center,—that is, about the axis of the spindle,—a hollow bearing, 26, is mounted upon the plate, 11. The jewel bearing, 12, for the spindle is mounted within this hollow bearing and the curb lever is journaled outside of it. The collet, 16, for holding the inner end of the spring is applied on the spindle above the said hollow bearing.

The amount of change in the operative length of the hair spring necessary to compensate for error due to change of temperature through 100° F. when the drag disk is of aluminum as in this instrument, must be about one-fifth of the total length of the spring which is nearly the amount of the entire outer coil. If the curb device employed as a stop to limit the operative length of the spring affords only a single point of bearing of the spring, the spring is liable to slip on the stop pin when the latter has been moved to a point considerably distant from the outer end fastening of the spring, and the spring is coiled by the rotation of the magnet at considerable speed. Such slipping of the spring along the pin, of course, tends to detract from the completeness of the correction for which the adjustable curb is provided. Such slipping is due to the fact that the tension of the coiled portion of the spring inside the pin pulling on the portion of the spring extending from the pin to the end fastening, tends to flatten the first mentioned portion,—that is, to draw it from its normal curved form and position toward a straight line, thus yielding some portion of the length for slippage on the pin. In order to prevent this slight defect in the action of the device, it is preferable to provide a second curb pin set from 45° to 90° back of the said first or leading pin, that is, between said leading pin and the outer-end-fastening of the spring. Such second stop pin is most conveniently provided by giving the curb lever a second arm, 30, carrying the second stop pin, 31, positioned as stated. The two stop pins, it will be understood, are positioned equally distant from the axis of the spindle so that they follow the same path as the curb lever swings, the second pin, serving, therefore, to reinforce the arc of the spring which is cut out of service by the leading stop pin to prevent it flattening under the stress of coiling the operative portion of the spring.

The form of the magnet according to this instrument as seen in Fig. 6 is a complete closed ring having a thin portion at one side at which the cross-section of the ring is reduced so that the magnetic flux tends in part to pass outside the metal across this portion of the ring; and the soft iron or steel plate, 11, operating in the well understood manner of a magnetic mass proximate to a magnet to afford a path superior to the air for the flux, increases the amount of flux which is cut by the drag disk. The form of the magnet being a closed ring constituting a closed magnetic circuit, renders it, as I believe, less susceptible to deteriorating influence and exterior magnetic fields than any magnet of equal size having an air gap between its poles.

In defining the magnet as a closed ring, I do not wish to limit myself to a magnet of circular form, since a circular form is not essential for this purpose; the term "ring" is intended to apply to a continuous integral metallic circuit of any convenient shape, the circular form illustrated being merely a preferred construction.

I claim:—

1. A magnetic speed indicating device comprising in combination with a rotatable magnet, a magnetic mass proximate thereto and a non-magnetic drag disk mounted for oscillation in the space between the magnet and magnetic mass; a helical spring for biasing the drag element to a pre-determined position of rest in its path of oscillation; a curb device for varying the operative length of the spring and for that purpose mounted to swing about the axis of oscillation of the disk, said curb device comprising two stops against which the spring may bear and which are separated from each other along their path of movement in the swinging of the curb.

2. A magnetic speed indicating instrument comprising in combination with a rotatable magnet, a magnetic mass proximate thereto, a drag element mounted for oscillation in the space between the magnet and the mass and means for biasing such drag element to a predetermined position of rest, the magnet consisting of a closed ring and being mounted for rotation about the axis of oscillation of the drag element.

3. In combination with means for producing a rotating magnetic field consisting of a circular magnet in the form of a closed ring having a portion reduced in cross section and being mounted for rotation about the axis of its circular form; a magnetic mass proximate to the magnet; a drag element mounted for oscillation in the space between the magnet and the mass, and means for biasing said drag element to a pre-determined position of rest.

4. In combination with means for producing a rotating magnetic field, comprising a rotatable circular magnet consisting of a closed ring mounted for rotation about the axis of its circular form; a drag disk mounted for oscillation about the axis of rotation of the magnet, and means for biasing the drag disk to a predetermined position of rest.

5. In combination with means for producing a rotating magnetic field, comprising a circular magnet consisting of a closed ring mounted for rotation about the axis of its circular form; a drag element in the form of a disk proximate to one side of the magnet and having a cylindrical flange encompassing the magnet proximate to the circumference of the latter, and mounted for oscillation about the axis of rotation of the magnet, and means for biasing such drag element to a pre-determined position of rest.

6. In combination with means for producing a rotating magnetic field comprising a circular magnet in the form of a closed ring reduced in cross section for a portion of its circumferential extent and mounted for rotation about the axis of its circular form; a drag element positioned proximate to the magnet and mounted for rotation about the same axis, and means for biasing such drag element to a pre-determined position of rest.

7. In a speed meter, a magnet in the form of a closed ring, having a portion reduced in cross section and being mounted for rotation, a drag element mounted for movement proximate to the path of rotation of said reduced portion of the magnet, and means biasing said drag element to a predetermined position of rest.

In testimony whereof, I have hereunto set my hand at Chicago, Illinois, this 16th day of May, 1912.

HENRY KOCOUREK.

Witnesses:
J. K. STEWART,
STANHOPE HUDSON.